(12) United States Patent
Ratzmann et al.

(10) Patent No.: US 7,655,915 B2
(45) Date of Patent: Feb. 2, 2010

(54) COLLIMATOR ASSEMBLY FOR COMPUTED TOMOGRAPHY SYSTEM

(75) Inventors: Paul Michael Ratzmann, Germantown, WI (US); Mark A. Kappel, Cambridge, WI (US)

(73) Assignee: General Electric Company, Schenectady, NY (US)

( * ) Notice: Subject to any disclaimer, the term of this patent is extended or adjusted under 35 U.S.C. 154(b) by 1232 days.

(21) Appl. No.: 10/249,859

(22) Filed: May 13, 2003

(65) Prior Publication Data

US 2004/0227092 A1    Nov. 18, 2004

(51) Int. Cl.
*G01T 1/20* (2006.01)
(52) U.S. Cl. ........................... 250/367; 378/149
(58) Field of Classification Search ........... 250/367; 378/149
See application file for complete search history.

(56) References Cited

U.S. PATENT DOCUMENTS

| | | | | |
|---|---|---|---|---|
| 2,665,387 A * | 1/1954 | Bartow | ........................ | 378/149 |
| 4,856,041 A * | 8/1989 | Klein et al. | ................... | 378/147 |
| 5,373,162 A * | 12/1994 | Akai | ............................ | 250/366 |
| 6,298,113 B1 * | 10/2001 | Duclos et al. | .................. | 378/19 |
| 6,479,824 B1 | 11/2002 | Hoffman | | |
| 6,480,563 B2 | 11/2002 | Hoffman | | |
| 6,516,044 B1 | 2/2003 | Lyons | | |
| 6,934,354 B2 * | 8/2005 | Hoffman | ....................... | 378/19 |

* cited by examiner

*Primary Examiner*—David P Porta
*Assistant Examiner*—Shun Lee
(74) *Attorney, Agent, or Firm*—Peter Vogel

(57) ABSTRACT

A detector assembly 18 for an imaging system 10 is provided comprising a plurality of scintillator elements 50 positioned within a scintillator pack 56. The scintillator pack 56 forms a scintillator pack upper surface 58 and a plurality of scintillator pack walls 60 positioned between the plurality of scintillator elements 50. A plurality of collimator elements 64 are mounted on the scintillator pack upper surface 58. Each of the plurality of collimator elements 64 is comprised of a stack laminated base 66 mounted to the scintillator pack upper surface 58 and a cast upper wall 68 formed on the stack laminated base 66.

4 Claims, 2 Drawing Sheets

COLLIMATOR ASSEMBLY FOR COMPUTED TOMOGRAPHY SYSTEM

BACKGROUND OF INVENTION

The present invention relates generally to a computed tomography assembly, and, more particularly to a collimator and scintillator assembly with improved manufacturing costs and accuracy.

Computed tomography has been utilized for a wide variety of imaging applications. One such category of applications is comprised of medical imaging. Although it is known that computed tomography may take on a wide variety of configurations within the medical industry, it commonly is based on the transmission of low energy rays through a body structure. These low energy rays are subsequently received and processed to formulate an image, often three-dimensional, of the body structure that can by analyzed by clinicians as a diagnostic aid.

The reception of the low energy rays, such as gamma-rays, is often accomplished through the use of a device referred to as a scintillator camera. The scintillator camera is typically comprises of a plurality of structures working in concert to-receive and process the incoming energy rays after they have passed through the body structure. A collimator is an element often found in a scintillator camera that is used to limit the direction of photons as they approach the scintillator element. The collimator is commonly used to increase the magnification of a viewed object or control resolution or field of view. Their primary purpose, however, is to control the protons impinging on the scintillator element.

The scintillator element, in turn, is commonly a material with the ability to absorb the protons and convert their energy into light. This allows the low energy rays received by the scintillator camera to be converted into useful information. Scintillator elements may come in a wide variety of forms and may be adapted to receive a wide variety of incoming rays. The light produced by the scintillator element is commonly processed by way of a device such as a light sensitive photo-diode which converts the light from the scintillator element into an amplified electronic signal. In this fashion, the information from the scintillator camera can be easily transferred, converted, and processed by electronic modules to facilitate viewing and manipulation by clinicians.

Current manufacturing methodologies for creation of scintillation cameras and the collimator components often present a multitude of challenges. The collimator components often consist of a matrix of tungsten plates in the z-direction and wires in the x-direction. These elements must be aligned with the scintillator and the x-ray focal spot. The height of the collimator elements in the y-direction is critical for scatter rejection. This scenario presents the following challenges: Plate bow along the z-direction is often realized. Alignment of the pack to the collimator in both x and z-directions can be difficult. Focal alignment of the plates can be difficult and costly. Improper manufacturing can result in undesirable sensitivity to focal spot motion.

The plate/wire construction that presents the aforementioned challenges has therefore prompted the development of new manufacturing technologies. Casting of collimator assemblies promises low cost and extensive cast heights. Casting, however, brings these benefits often at the expense of dimensional accuracy from the top to bottom of the casting. Stack laminations, alternatively, may also be utilized as it can provide desired dimensional accuracy. Stack laminations, however, can result undesirable costs in addition to presenting limitations on stack height. Thus each approach can carry with it characteristics that may undermine its use in collimator manufacturing.

It would, however, be highly desirable to have a collimator assembly that utilized the expense and sizing capabilities of cast collimators without suffering from the dimensional accuracy issues. Similarly, it would be highly desirable to have a collimator assembly that utilized the dimensional accuracy of stack collimators without suffering from the expense and height limitations associated with stack manufacturing.

SUMMARY OF INVENTION

A detector assembly for an imaging system is provided comprising a plurality of scintillator elements positioned within a scintillator pack. The scintillator pack forms a scintillator pack upper surface and a plurality of scintillator pack walls positioned between the plurality of scintillator elements. A plurality of collimator elements are mounted on the scintillator pack upper surface. Each of the plurality of collimator elements is comprised of a stack laminated base mounted to the scintillator pack upper surface and a cast upper wall formed on the stack laminated base. Other features of the present invention will become apparent when viewed in light of the detailed description of the preferred embodiment when taken in conjunction with the attached drawings and appended claims.

DETAILED DESCRIPTION

Figure 1:
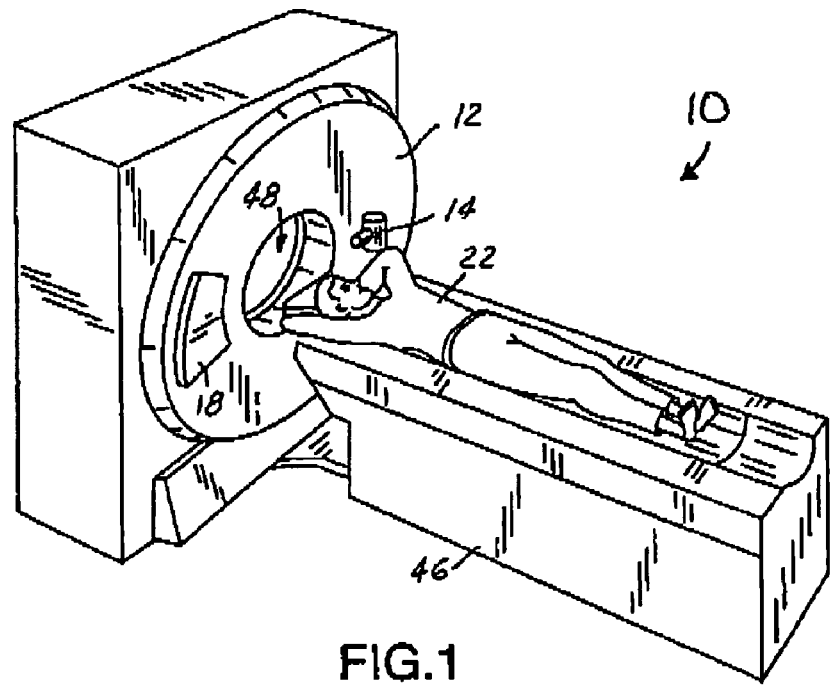
FIG. 1 is an illustration of a computed tomography imaging system for use with the present invention.
Figure 2:
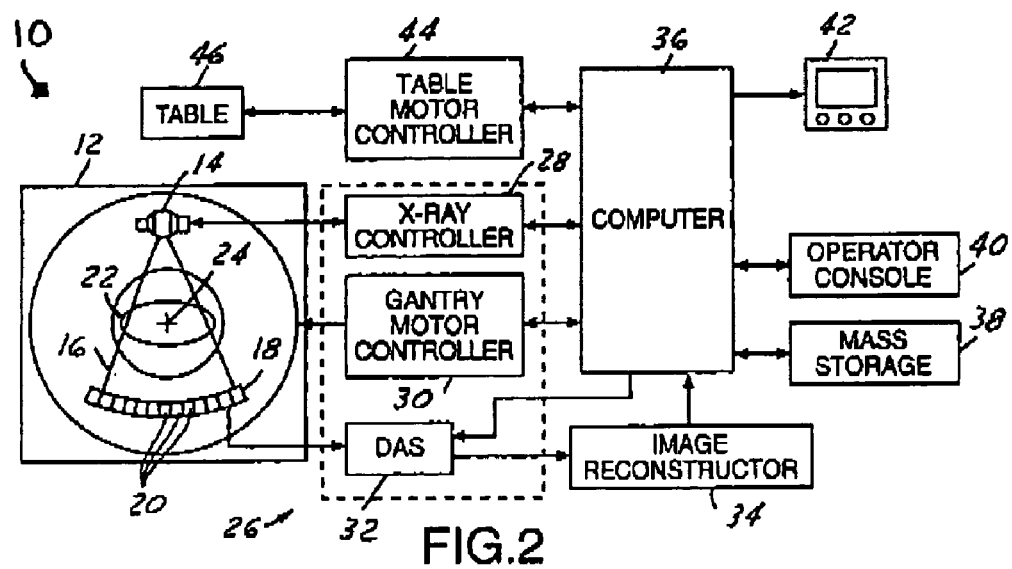
FIG. 2 is a block schematic diagram of the computed tomography imaging system illustrated in FIG. 1.

Referring now to FIG. 1, which is an illustration of a computed tomography (CT) imaging system 10 for use with the detector assembly 18 of the present invention. Although a particular CT imaging system 10 has been illustrated, it should be understood that the detector assembly 18 of the present invention can be utilized in a wide variety of imaging systems. The CT imaging system 10 includes a scanner assembly 12 illustrated as a gantry assembly. The scanner assembly 12 includes an x-ray source 14 for projecting a beam of x-rays 16 toward a detector assembly 18 positioned opposite the x-ray source 14. The detector assembly 18 includes a plurality of detector elements 20 which combine to sense the projected x-rays 16 that pass through an object, such as a medical patient 22. Each of the plurality of detector elements 20 produces an electrical signal that represents the intensity of an impinging x-ray beam and hence the attenuation of the beam 16 as it passes through the object of patient 22. Commonly, during a scan to acquire x-ray projection data, the scanner assembly 12 is rotated about the center of rotation 24. In one embodiment, illustrated in FIG. 2, detector elements 20 are arranged in one row such that projection data corresponding to a single image slice is acquired during a scan. In other embodiments, the detector elements 20 can be arranged in a plurality of parallel rows, such that projection data corresponding to a plurality of parallel slices can be acquired simultaneously during a scan.

The rotation of the scanner assembly 12 and the operation of the x-ray source 14 are preferably governed by a control mechanism 26. The control mechanism 26 preferably includes an x-ray controller 28 that provides power and timing signals to the x-ray source 14 and a scanner motor controller 30 that controls the rotational speed and position of the scanner assembly 12. A data acquisition system (DAS) 32 in control mechanism 26 samples analog data from the detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

The computer 36 also can receive commands and scanning parameters from an operator via console 40 that has a keyboard or similar input device. An associated display 42 allows the operator to observe the reconstructed image and other data from the computer 36. The operator supplied commands and parameters are used by computer 36 to provide control signals and information to the DAS 32, x-ray controller 28, and scanner motor controller 30. In addition, the computer 36 operates a table motor controller 44 which controls a motorized table 46 to position patient 22 within the scanner assembly 12. Particularly, the table 46 moves portions of the patient 22 through the scanner opening 48.

Figure 3:
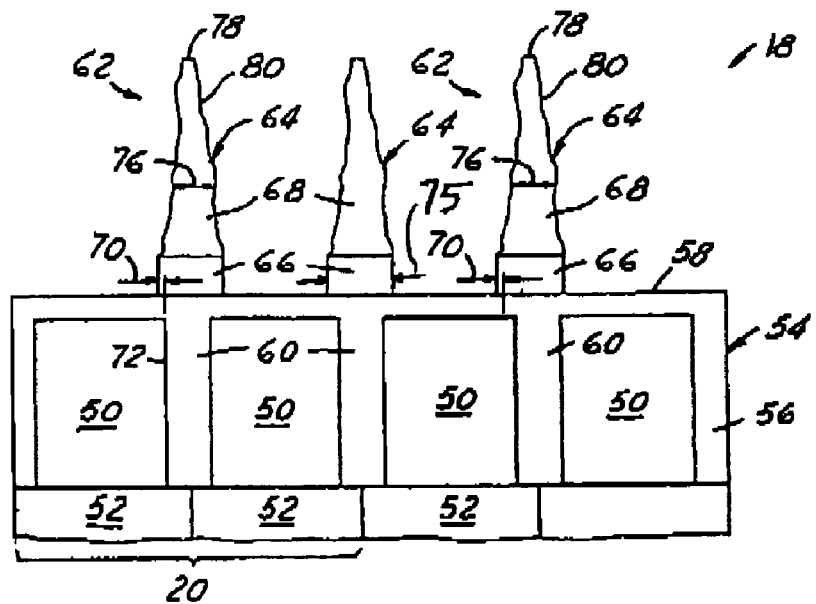
FIG. 3 is an illustration of a detector assembly in accordance with the present invention.

Each of the detector elements 20 of the detector assembly 18 produces a separate electrical signal that is a measurement of the beam attenuation at the detector location. As illustrated in FIG. 3, the detector assembly 18 includes a plurality of scintillator elements 50 each of which is associated with one of the detector elements 20. Scintillator elements 50 are known devices that, when struck by x-rays, convert at least a portion of the energy of the x-rays into light that can be detected by the detector elements 20, commonly photodetectors 52. The photodetectors 52, such as photodiodes or photocells, are commonly optically coupled to the backs of the scintillator elements 50 and are utilized to generate electrical signals representative of the light output from the scintillator elements 50. The attenuation measurements from all detector elements 20 in the detector assembly 18 are acquired separately to produce a transmission profile. It should be understood that FIG. 3 illustrates a cross-section of the detector assembly 18 and is intended to be representative of both linear and multi-dimensional arrays of detectors.

The scintillator elements 50 are preferably contained within a scintillator assembly 54 which comprises a scintillator pack 56. Although the scintillator pack 56 maybe constructed in a variety of fashions, one embodiment contemplates the use of a cast scintillator pack containing a reflector mixture. Although a variety of scintillator pack 56 mixtures are contemplated, one embodiment contemplates the use of a castable material such as an epoxy, and a filler material. The filler material can include a reflective material sufficient to effectively scatter and reflect light within the scintillator pack 56. The reflective material is cast or formed to generate a scintillator pack upper surface 58 and a plurality of scintillator pack walls 60. Each of the scintillator pack walls 60 is positioned between two of the plurality of scintillator elements 50.

The present invention further includes a collimator assembly 62 in communication with the scintillator pack 56. The collimator assembly 62 is utilized to control the x-rays impacting the scintillator elements 50. The collimator assembly 62 is comprised of a plurality of collimator elements 64, each corresponding to one of the scintillator pack walls 60. Prior collimator elements often provided either cost benefits or dimensional accuracy. The present collimator elements 64 provide a unique combination of these characteristics by including a stack laminated base 66 and a cast upper wall 68. The stack laminated base 66 is preferable bonded directly to the scintillator pack upper surface 58. The stack laminated base 66 assures accurate alignment with the scintillator pack walls 60. The increase accuracy allows the wall overlap 70 between the edge of the stack laminated base 66 and the edge of the scintillator element 72 to be minimized. This improves coverage and thus increase output efficiency. In addition, the stack laminated base 66 allows for an accurate control of the collimator element 64 height, as the lamination height dimension may be easily adjusted, which allows for improved dimensional accuracy.

Figure 4:
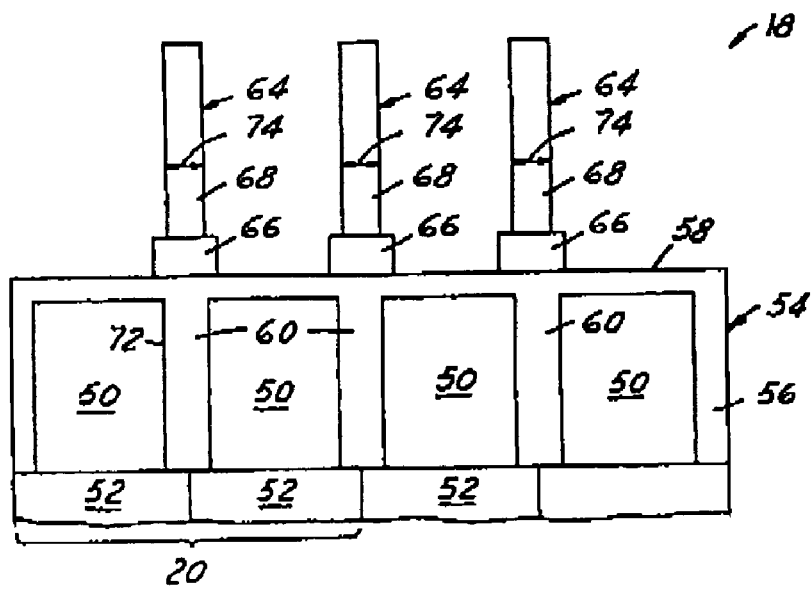
FIG. 4 is an illustration of an alternate detector assembly in accordance with the present invention.

The collimator elements 64 combine the dimensional accuracy associated by the stack laminated base 66 with the cost effective characteristics associated with the cast upper wall 68. The cast upper wall 68 is preferably cast directly onto the stack laminated base 66 with a cast wall thickness 74 less than the stack lamination width 75. In one embodiment, it is contemplated that the cast upper wall 68 may be cast as a thin wall configuration having a substantially constant cast width 74 (FIG. 4) In another embodiment, it is contemplated that the cast upper wall 68 may be cast with a tapered cast width 76 that decreased towards the cast upper edge 78 (FIG. 3). In addition, the tapered cast width 76 can be formed with an irregular surface 80 such that the taper is varied along the length of the cast upper wall 68. The combination of the stack laminated base 66 and the cast upper wall 68 creates a collimator assembly 62 that can be less sensitive to focal spot motion, can assure accurate alignment relative to the scintillator elements 50, and can minimize the requirement for focal alignment while maintaining desired scatter rejection properties.

While particular embodiments of the invention have been shown and described, numerous variations and alternative embodiments will occur to those skilled in the arm. Accordingly, it is intended that the invention be limited only in terms of the appended claims.

The invention claimed is:

1. A method of generating a detector assembly for an imaging systems comprising:
   stack laminating a collimator base onto a scintillator pack upper surface;
   casting a collimator upper wall onto said collimator base.

2. A method of generating a detector assembly as described in claim 1, further comprising:
   controlling the height of a collimator element, formed by said collimator base and said collimator upper wall, by adjusting the height of said collimator base.

3. A method of generating a detector assembly as described in claim 1, further comprising:
   casting an irregular taper into said collimator upper wall.

4. A method of generating a detector assembly as described in claim 1, wherein said
   collimator upper wall have a cast wall thickness less than a stack lamination width of said collimator base.

* * * * *

UNITED STATES PATENT AND TRADEMARK OFFICE
CERTIFICATE OF CORRECTION

PATENT NO. : 7,655,915 B2 Page 1 of 1
APPLICATION NO. : 10/249859
DATED : February 2, 2010
INVENTOR(S) : Ratzmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Thirtieth Day of November, 2010

David J. Kappos
*Director of the United States Patent and Trademark Office*